United States Patent [19]

Krause et al.

[11] Patent Number: 4,643,589

[45] Date of Patent: Feb. 17, 1987

[54] THERMOMETRY EMPLOYING GALLIUM ALUMINUM ARSENIDE DIODE SENSOR

[75] Inventors: John K. Krause, Powell; Bradley C. Dodrill, Columbus, both of Ohio

[73] Assignee: Lake Shore Cryotronics, Inc., Westerville, Ohio

[21] Appl. No.: 764,384

[22] Filed: Aug. 9, 1985

[51] Int. Cl.$^4$ .............................................. G01K 7/00
[52] U.S. Cl. ..................................... 374/178; 374/176
[58] Field of Search ................... 374/176, 178; 357/28

[56] References Cited

U.S. PATENT DOCUMENTS

| | | | |
|---|---|---|---|
| 2,691,577 | 10/1954 | Lark-Horovitz | 75/134 |
| 3,092,998 | 6/1963 | Barton | 73/362 |
| 3,142,987 | 8/1964 | Dowling | 73/362 |
| 3,187,193 | 6/1965 | Rappaport et al. | 374/178 |
| 3,274,456 | 9/1966 | Pittler | 317/234 |
| 3,440,883 | 4/1969 | Lightner | 374/178 |
| 3,719,797 | 3/1973 | Andrews, Jr. | 219/501 |
| 3,725,821 | 4/1973 | Mitsui | 357/28 |
| 3,780,585 | 12/1973 | Milo | 374/178 |
| 3,791,217 | 2/1974 | Stout et al. | 374/178 |
| 3,801,949 | 4/1974 | Larrabue | 320/22 R |
| 3,881,113 | 4/1975 | Rideout | 357/30 |
| 3,996,451 | 12/1976 | Harrington | 235/92 MT |
| 4,035,757 | 7/1977 | Einthoven | 338/25 |
| 4,050,083 | 9/1977 | Jasbolski | 357/28 |
| 4,071,813 | 1/1978 | Dobbin | 323/8 |
| 4,090,151 | 5/1978 | Presmet | 331/66 |
| 4,215,577 | 8/1980 | Griffing et al. | 374/178 |
| 4,224,537 | 9/1980 | Glazer | 374/178 |
| 4,456,919 | 6/1984 | Tomita et al. | 374/178 |
| 4,546,373 | 10/1985 | Todd et al. | 374/178 |

Primary Examiner—Charles Frankfort
Assistant Examiner—Thomas B. Will
Attorney, Agent, or Firm—Mueller and Smith

[57] ABSTRACT

A thermometer is described having a broad voltage-temperature characteristic rendering it useful in making temperature measurements from below 1° K. to above 500° K. The thermometer employs a gallium aluminum arsenide diode and displays improved sensitivity over more conventional diode devices. In addition to providing for improved polynomial fitting for calibration curve purposes, the diode also exhibits an advantageously low magnetic field dependence.

17 Claims, 7 Drawing Figures

THERMOMETRY EMPLOYING GALLIUM ALUMINUM ARSENIDE DIODE SENSOR

BACKGROUND

Temperature measuring techniques providing readouts in the cryogenic range are finding broadened applications across the scientific spectrum. These applications may range from superconductivity to devices intended for location in outer space. Generally, the type thermometer involved in such measurements is constructed employing a sensing component which has a capability to change one or more of its sensible electrical parameters or characteristics as the temperature of its environment is changed. Sensing elements which exhibit these characteristics are provided in a variety of forms, including thermocouples, resistive elements and, more recently, solid-state devices such as diodes. Selection of a particular sensing element generally involves trade-offs and usually will be predicated upon the intended use of the device. As an example, a wide range sensor is desirable for applications such as high vacuum systems which are heated or baked to temperatures of at least 250° C. such that their thus-energized surfaces are outgassed. Subsequently, the same systems are operated in the cryogenic range, often at temperatures below 4° K. Where a thermometer is to be mounted within such high vacuum systems, it is called upon to survive the baking procedures and yet remain stable to achieve accurate readings at the lower cryogenic range temperatures. One device recently made available for this application is a Rh-Fe resistance thermometer. However, its applications are limited by cost, size, and other factors.

Resistive devices provide readouts within the cryogenic range, but are often bulky and perform only in conjunction with more elaborate electrical support and with more sophisticated measurement methods. Conversely, solid-state devices, such as diodes, are relatively facile to operate, a constant current source being employed with them and the forward junction voltage drop (V) being utilized as the temperature related readout. Silicon diodes are popularly employed as thermometers in the cryogenic range, however, their use is subject to operational restrictions. For example, it is desirable that the sensitivities of the diodes (dV/dT, where T=Temperature), exhibit a smooth transition over their operational temperature ranges. Where such smooth transitioning is available, polynomial curve fits are achieved readily by the practitioner. Unfortunately, the silicon devices display somewhat complex sensitivity characteristics. Many applications of thermometry also involve environments wherein the sensing elements are subjected to magnetic fields of varying intensities. In part because of the forbidden band characteristics of certain of the diode structures, they will exhibit an unwanted shift of output under magnetic environments. Further, each previously available diode material has traditionally exhibited somewhat limited capabilities for measuring both at elevated temperatures as well as in the cryogenic range. Another aspect considered in the selection of thermometer sensing elements resides in the repeatability of their performance. While these elements may exhibit a requisite sensitivity over desired temperature ranges, where their readouts vary or drift over a number of temperature range cycles, their suitability for employment as thermometers is negated. Thus, the selection of any element for thermometry involves subjecting the materials to repeated cycling, for example, from room temperature to that of liquid helium and a subsequent evaluation of any drift in their output from cycle to cycle. Still another aspect in the selection of thermometer components resides in their sensitivity at very low cryogenic ranges, for example below 4° K. Very minor alterations of temperature at these levels translate into substantial percentages of temperature change. Thus, lowered sensitivities at these critical ranges are unfortunate.

For many applications, another aspect for sensor selection resides in their capability for "matching". Matched sensors will exhibit very similar voltage-temperature characteristic curves. Where such characteristic standardization is available, calibration procedures may be avoided.

From the foregoing, it may be observed that desired characteristics in the selection of sensing elements for cryogenic range thermometers includes the facileness with which they may be used, as exhibited in solid-state diode structures; the stability of such devices in providing accurate readouts over numerous cycles of use; the relative immunity of such devices to the effects of magnetic fields and the like; the capability of such devices to be useable over a wide temperature range; and the smooth transitioning of sensitivity curves which such devices may exhibit, affecting the ease of calibration curve fitting.

SUMMARY

The present invention is addressed to a thermometer and method of temperature measurement which employs a gallium aluminum arsenide diode as its sensing element. This sensing element exhibits a very broad utility, having a voltage-temperature characteristic making it useful from below 1° K. to above 500° K. Thus, thermometers incorporating the diode as a sensing element find ready application in systems requiring wide range temperature operation as in the case of high vacuum systems wherein a baking stage is resorted to as part of fabrication procedures. Thermometers employing the diode exhibit significantly improved temperature sensitivity (dV/dT) and, of additional importance, this sensitivity is excellent in the temperature region below about 50° K. Another aspect of this feature of sensitivity resides in the smooth transitioning characteristic curve corresponding therewith. As a consequence of this characteristic, polynomial fits are readily carried out by the practitioner.

As another feature of the invention, the thermometer structure utilizing a gallium aluminum arsenide diode as a sensor exhibits advantageously low magnetic field dependence.

Other objects of the invention will, in part, be obvious and will, in part, appear hereinafter. The invention, accordingly, comprises the apparatus and method possessing the construction, combination of elements, arrangement of parts, and steps which are exemplified in the following detailed disclosure.

For a fuller understanding of the nature and objects of the invention, reference should be had to the following detailed description taken in conjunction with the accompanying drawings.

DETAILED DESCRIPTION

In its preferred embodiment, the sensing element employed for thermometry in accordance with the instant invention is a solid-state, PN junction device formed of the crystalline, doped alloy, gallium aluminum arsenide. Such gallium aluminum arsenide devices, structured as diodes, are available in the marketplace, heretofore having been used principally as light emitting diodes (LED's) or near infrared diodes and for lasing. Diodes containing the elements gallium, aluminum, and arsenic may vary with respect to the ratio of gallium and aluminum to arsenic generally with the purpose of adjusting the wavelength of peak spectral emission. Present commercial gallium aluminum arsenide diodes exhibit an aluminum gradient therethrough. The aluminum content at the diode junction is believed to be primarily responsible for the peak spectral response of the dioe, while the bulk aluminum content is believed to be primarily responsible in determining the series resistance (or insulative properties) of the diode. Fortunately, precise stoichiometric and gradient characterization of the gallium aluminum arsenide diodes is not necessary. Application to the function of thermometry is achieved (a functional voltage-temperature characteristic being evidenced) where the peak emission wavelength is less than about 920 nanometers (nm). Advantageously, the devices are selected exhibiting peak spectral emission wavelengths lying in the range between about 600 nm and 900 nm and preferably between about 800 nm and 900 nm.

Figure 1:
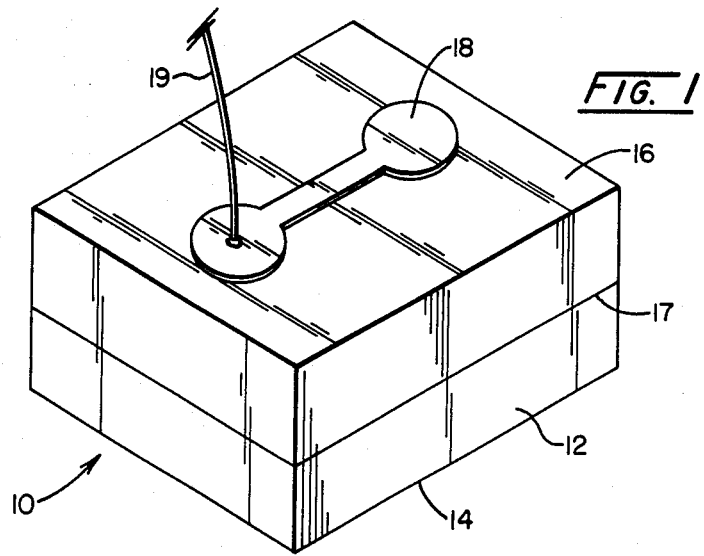
FIG. 1 is a schematic, perspective representation of a gallium aluminum arsenide diode employed with the present invention.

A preferred gallium aluminum arsenide diode, for example, as marketed by the Opto-Electronics Division of TRW, Inc. of Carrollton, Tex., exhibits a peak spectral emission of 880 nm and is represented in FIG. 1. Such diodes are quite small, having dimensions such as 0.010"×0.012"×0.007" and being formed of liquid phase epitaxial gallium aluminum arsenide. The diode, shown generally at 10, is formed having a P portion 12 with a metal alloy contact (metallization) upon its entire lower exposed surface as at 14. The N portion of the diode is represented generally as the upper portion thereof at 16, the two portions generally extending outwardly from a "junction" 17. Formed over the top exposed surface of N doped portion 16 is a metal pad 18.

When used in the instant thermometer application, the diode as at 10 is packaged in any of a variety of configurations, depending upon its intended use. In this regard, reference is made to FIGS. 2 and 3 where one typical packaging arrangement is shown at 20. The package 20 includes a cap-shaped housing base 22 which is formed of a gold plated kovar alloy. Electrical leads 24 and 26 are sealed to base 22 and electrically insulated with glass frit. The diode chip 10 is revealed in the instant figures as being fastened at surface 14 to the base 22. This may be carried out with a conductive epoxy or a gold alloy or soft indium-based solder. Very fine gold wire is connected between the metal pad 18 and the gold plated lead 24. The entire arrangement is sealed for structural security.

The packaging technique selected will vary to suit selected circumstances, and, at times, may degrade sensor performance. For instance, temperature range restrictions may be imposed in consequence of packaging selection. Other packaging techniques, for example, those utilized in the testing of the diodes, as described later herein, provide for the simple packaging or epoxy potting of the diodes with leads extending therefrom in a gold, phosphor-bronze, or platinum material. Specifically, the materials are characterized in the absence of ferromagnetic substances. It may be noted that the above-mentioned kovar material is magnetic. A complete thermometer typically includes the packaged diode, a constant current source, and instrumentation for reading the voltage drop. In this regard, incorporated herein by reference is Griffing et al., U.S. Pat. No. 4,215,577.

When employed as the sensing element of a thermometer, the diodes 10 have exhibited the following desirable general characteristics as discussed in detail later herein:

1. Their magnetic field dependance is relatively low as compared to other cryogenic temperature sensors with the exception of those formed of gallium arsenide;

2. The diode sensors have voltage-temperature characteristics making the devices useful from below 1° K. to above 500° K.;

3. A significant improvement in temperature sensitivity (dV/dT) occurs, particularly at temperatures below 50° K.

4. The calibration curve (voltage versus temperature) exhibits very smooth transition characteristics which permits facile curve fitting and interpolation schemes for the employment of the devices in a variety of installations.

5. Generally, gallium aluminum arsenide diodes are configured as direct band gapped single junction devices. Accordingly, they hold promise as being more immune to reaction or output variances in the presence of magnetic fields.

Tests carried out to determine the suitability of gallium aluminum arsenide diodes as temperature sensors included: repeatability testing under thermal cycling; long term repeatability cycling; drift characteristic determinations; evaluation for matching; d.c. noise tests; temperature-voltage characteristic performance evaluation; and magnetic field dependence tests.

The repeatability or stability characteristic for the gallium aluminum arsenide diode was examined by thermally cycling some packaged diodes. A set of 69 diodes exhibiting a peak wavelength emission of 880 nm was cycled from room temperature into liquid helium with an average temperature repeatability at 4.2° K. of ±0.004° K. over four thermal cycles. This stability is comparable to or better than present commercial diode temperature sensors. A set of six diodes, specially mounted for high temperature usage, was thermally cycled from about 500° K. into liquid helium. These devices had an average repeatability at 4.2° K. of ±0.003° K. over ten thermal cycles. These measured reproducibilities are excellent and demonstrate the feasibility of using these diodes reliably to as high as 500° K., filling a void which now exists in thermometry.

In addition to being very repeatable, the gallium aluminum arsenide diodes now show a fairly tight distribution of their 4.2° K. voltage readings (measured at 10 microamperes). The group of 69 diodes mentioned above had an average 4.2° K. voltage reading of 5.052 volts with a standard deviation of 0.48 volts (about 2.6° K.). This compares with a group of 41 gallium arsenide diodes which had an average 4.2° K. voltage of 5.252 volts with a standard deviation of 1.851 volts (about 10° K.). The tighter distribution in the gallium aluminum arsenide is advantageous because it permits the fabrication of matched temperature sensors.

Ten gallium aluminum arsenide diodes as at 10 were tested in conjunction with ten corresponding diodes formed of gallium arsenide to determine their drift characteristics. In the latter regard, given a stable temperature at which the tested devices are maintained, a change or drift in their voltage output after application of a constant current drive. In keeping with the practices of the industry, these voltage output drifts or changes generally are recorded in terms of corresponding temperature changes (degrees millikelvin, °mK.). Table 1 below shows the form of drift data developed in conjunction with the testing of 10 gallium arsenide diodes and 10 gallium aluminum arsenide diodes for room temperature (measured at 305° K.), as well as immersed in liquid helium (4.2° K.), and in conjunction with applied currents of 1 microampere and 10 microamperes. Voltage drops across the diodes were measured with a Hewlett-Packard Voltmeter (DVM) Model 3456A. In the table, for the room temperature (RT) measurements, the average temperature drift following 3½ minutes at 305° K. is designated $\Delta T$ and is measured in degrees millikelvin units. The standard deviation, Std. Dev. (°mK.) over 10 devices for the measurements is provided and, additionally, the percent of drift occurring within the first 30 seconds of measurement is recorded.

TABLE 1

Drift Data

At Room Temperature (305° K.)

| Current (μA) | $\Delta T$ (°mK.) | Standard Deviation (°mK.) | Percent Drift |
|---|---|---|---|
| Gallium Arsenide | | | |
| 1 | 118 | 245 | 68.5 |
| 10 | 103 | 48 | 60.7 |
| Gallium Aluminum Arsenide | | | |
| 1 | 19.5 | .06 | 37 |
| 10 | 20.9 | 13.7 | 24 |

At 4.2° K.

| Current (μA) | $\Delta T'$ (°mK.) | Standard Deviation (°mK.) | |
|---|---|---|---|
| Gallium Arsenide | | | |
| 1 | 3 | 4.3 | |
| 10 | 1.1 | .1 | |
| Gallium Aluminum Arsenide | | | |
| 1 | 1.6 | 1.6 | |

TABLE 1-continued

Drift Data

| | | |
|---|---|---|
| 10 | 1.6 | .1 |

Returning to Table 1, it may be observed that the gallium arsenide diodes exhibited desirably high percentage drift values, however, the drift values, $\Delta T$, for the diodes were quite high. In comparison, while the percentage drift of the gallium aluminum arsenide diodes was relatively low, this low value is more than compensated by the very high improvement in temperature drift characteristic, $\Delta T$. Note that the drift is about 20° mK. for both 1 and 10 microamps of applied current.

These same diodes were tested by being commonly mounted upon a probe in conjunction with standard thermometer components and immersed in a Dewer flask containing liquid nitrogen. Their "settle in" characteristics were noted after current drive was applied. At this 77° K. temperature level, the drift rates for both gallium arsenide and gallium aluminum arsenide diodes were found to be comparable. In this regard, $\Delta T$ values of drift for both one and 10 microamperes of applied constant current were found to be on the order of 8° mK. with a 10° mK. worst case. No drift at all was observed with certain of the diodes so tested. The gallium arsenide diodes did appear to "settle in" more rapidly. However, this characteristic is of minimal import, inasmuch as in typical field applications the devices are operated under somewhat continuous current drive conditions.

Table 1 further shows the performance, as an average of the diodes when the above-noted probe upon which they were mounted was immersed in liquid helium, the standard thermometer showing an immersion temperature of 4.2° K. Drift measurements, T', represent the average temperature drift after 5 minutes of such immersion. The sensors "settled in" so rapidly as to preclude the necessity for recording percentage drift. Note that the drift at this much lower temperature is quite low for applied currents of both one microampere and 10 microamperes.

From the foregoing it may be observed that the gallium aluminum arsenide diodes as at 10 exhibit acceptable drift characteristics when employed for the purpose of sensing temperature.

The repeatability or stability characteristic for the gallium aluminum arsenide diodes was examined in conjunction with a corresponding examination of a typical silicon diode temperature sensor. In this regard, 12 silicon diodes were employed along with six gallium aluminum arsenide diodes, the diodes being mounted upon separate probe structures. These silicon diodes were cycled 10 times from 305° K. to 4.2° K., while the gallium aluminum arsenide diodes were cycled ten times, but much more rigorously, i.e. from 500° K. to 4.2° K. A constant current of 10 microamperes was used in all cases as the diode drive current. The results of this stability test are revealed in Table 2, where it may be observed that the peak-to-peak deviation as measured in millikelvin, p/p (°mK.) shows a value of 5.6° mK. and a standard deviation of 1.6° mK. Correspondingly, the silicon diodes, having been subjected to a less rigorous temperature range, showed a higher peak-to-peak deviation of 8.3° mK. and a higher standard deviation of 2.6° mK.

TABLE 2

| Repeatability at 4.2° K. | | |
|---|---|---|
| | Gallium Aluminum Arsenide | Silicon |
| p/p dev. (°mK.) | 5.6 | 8.3 |
| Std. dev. (°mK.) | 1.6 | 2.6 |

A characteristic identified as "DC Noise" was evaluated utilizing the same 16 diodes as were employed with the repeatability test above. For this test, the noted digital voltmeter was used with no filtering options active and utilizing a 10 power line cycle (10 PLC) reading rate to provide 320 readings. Average peak-to-peak deviation (°mK.) and average standard deviation (°mK.) were computed from these readings and then average values for the gallium aluminum arsenide and silicon sensors were calculated. Table 3 shows the statistical results for temperatures of 305° K. (room temperature) 77° K. and 4.2° K. Note that at 305° K. and at 4.2° K., the gallium aluminum arsenide diodes evidenced better performance than corresponding silicon diodes and that at 77° K. and the diodes performed essentially equivalently.

TABLE 3

| D.C. Noise | | |
|---|---|---|
| | Gallium Aluminum Arsenide | Silicon |
| | 305° K. | |
| Avg. p/p dev. (°mK.) | 6.9 | 15.5 |
| Avg. std. dev. (°mK.) | 1.0 | 2.1 |
| | 77° K. | |
| Avg. p/p dev. (°mK.) | 47.9 | 43.4 |
| Avg. Std. dev. (°mK.) | 11.9 | 10.7 |
| | 4.2° K. | |
| Avg. p/p dev. (°mK.) | 0.6 | 8.7 |
| Avg. Std. dev. (°mK.) | 0.1 | 1.5 |

Figure 4:
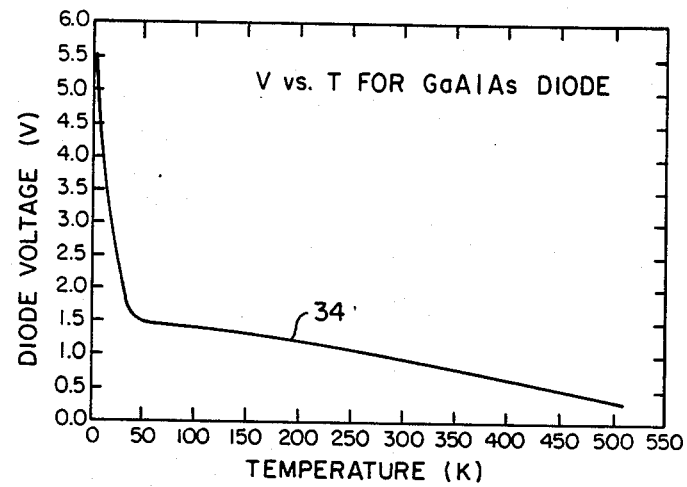
FIG. 4 is a voltage versus temperature curve showing the performance of gallium aluminum arsenide diodes as temperature sensing elements.

Referring to FIG. 4, a typical voltage versus temperature (°K.) characteristic for a gallium aluminum arsenide diode is represented by the curve 34. Curve 34 shows not only that the diode constitutes a viable sensor over a very broad range of temperatures, for example ranging from 500° K. to 1° K., but also that the curve is quite linear between 50° K. and 500° K., a characteristic very valuable in thermometry. Of particular importance, the diode shows a highly enhanced sensitivity for temperatures extending downwardly therefrom. Because practitioners wish to measure in terms of degrees millikelvin in such ranges, high sensitivity is necessary in order to resolve a temperature change and thus, higher corresponding voltage changes are a most desirable sensor attribute.

Figure 5:
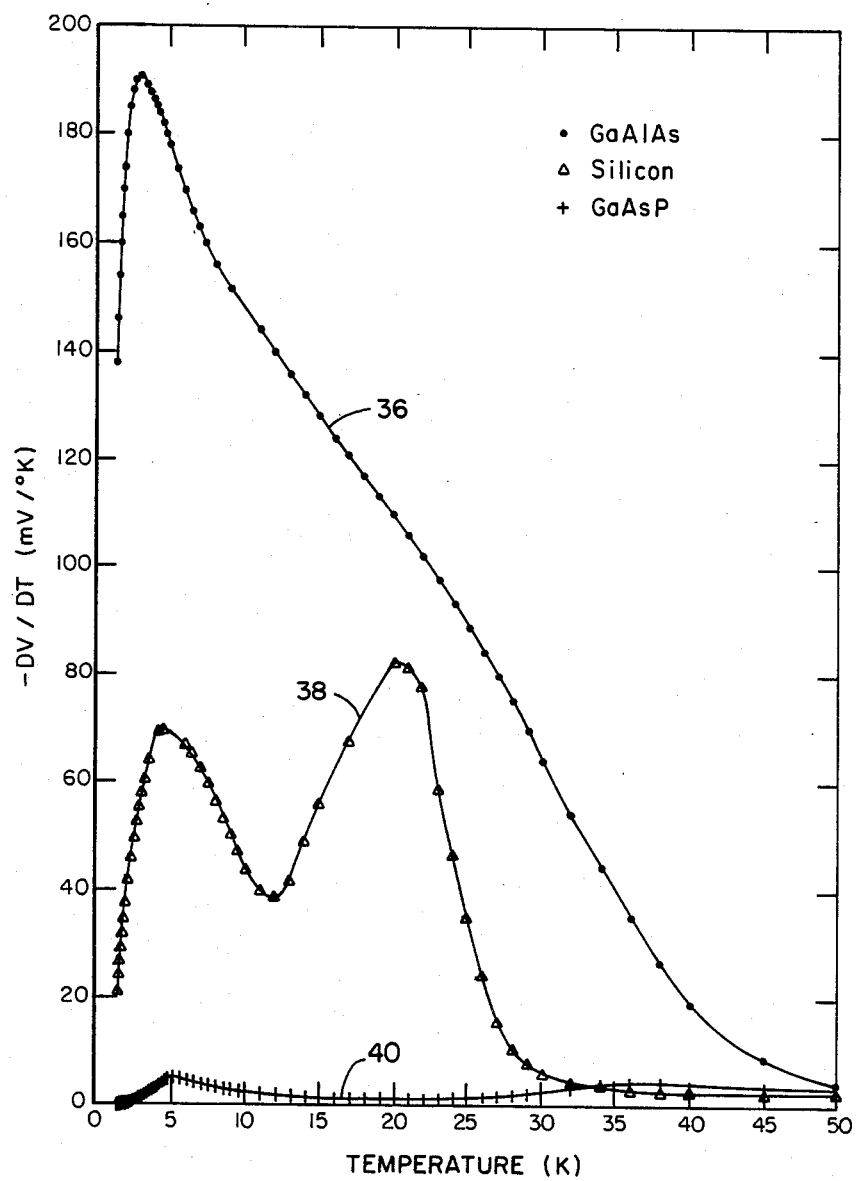
FIG. 5 shows a family of curves comparing the temperature sensitivity characteristics (dV/dT vs. T) of gallium aluminum arsenide, silicon, and gallium arsenide phosphide diodes.

Referring to FIG. 5, the comparatively improved sensitivity performance of the gallium aluminum arsenide diode is revealed. Comparative curves relating temperature, °K., with change of voltage with temperature, dV/dT, measured in millivolts per degree kelvin are set forth in the figure. Note that a curve 36, representing the gallium aluminum arsenide diode, advantageously exhibits a smooth transition for essentially the entire extent of the range shown, thus permitting more fascile polynomial curve fit procedures for instrument readout purposes. A corresponding sensitivity curve for a silicon diode is shown at 38. Curve 38 may be observed to show a more complex pattern of sensitivity, particularly between the temperature values 10° K. and 20° K. The uneven curve transition thus revealed makes curve fitting more difficult for the practitioner. Of particular note, it may be observed that the level of sensitivity of the gallium aluminum arsenide diode (curve 36) as compared with that of the silicon diode, represented by curve 38, shows the former to have an advantageously much higher sensitivity characteristic. In this regard, the sensitivity of the silicon diode at 4.2° K. has been measured at about 68 mV/°K. while the corresponding sensitivity for a gallium aluminum arsenide diode at that temperature has been found to be about 170 mV/°K. Curve 40 in FIG. 5 shows the sensitivity response for a gallium arsenide phosphide diode. In effect, that material is shown to be unacceptable for cryogenic region temperature measurement.

Figure 6:
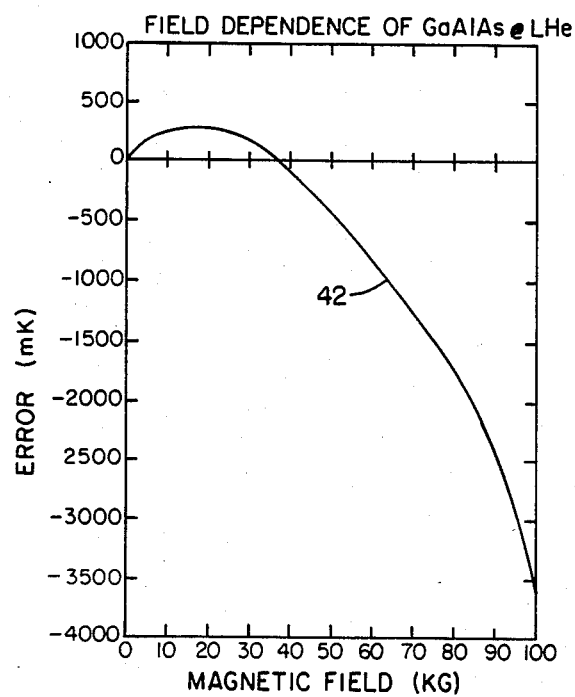
FIG. 6 is a curve representation showing the magnetic field dependance of gallium aluminum arsenide diodes within a liquid helium environment.

Now, considering the magnetic field dependence of the gallium aluminum arsenide diode when used as the sensor component of a thermometer, reference is made to FIG. 6 wherein a curve 42 relating the error effect of magnetic field in degrees millikelvin (°mK.) with applied magnetic field in kilogause (kG) is shown. In developing curve 42, a gallium aluminum arsenide diode was submerged in liquid helium so as to be held at about a 4.2° K. temperature. The magnetic field then was applied in increments commencing with a 0 value and any change of voltage across the diode was observed and converted to equivalent or apparent temperature change. It may be observed from the curve that, at low to moderate fields, the error reflected as temperature change is quite acceptable, being less than about 5 percent. This is improved performance, for example, over silicon or germanium diode devices used as temperature sensors and is comparable to that realized with presently available commercial gallium arsenide devices.

Now looking to the long term repeatability characteristics of thermometers employing gallium aluminum arsenide diodes, a grouping of ten sensors were prepared. In this regard, seven of the sensors, identified by the sequence TG-120-FP-1 through TB-120-FP-7 were packaged in a type TG-120-FP marketed by Lake Shore Cryotronics, Inc., Westerville, Ohio. The packaging is provided as an epoxy in conjunction with gold and phosphor-bronze lead configurations. Three of these sensors were packaged in gold-plated kovar devices similar to those described in conjunction with FIGS. 2 and 3, and also marketed by Lake Shore Cryotronics, Inc. (supra). These devices are identified herein as series OPC-230-2 through OPC-230-4. The diode devices were of a variety having peak spectral emissions of 880 nm.

The above-identified type TG-120-FP sensors were subject to a production test on Mar. 4, 1985. This test comprised a procedure wherein the forward voltage of each diode sensor under a constant d.c. excitation current of 10 microamperes was read first in a room temperature controlled furnace at 305° K. and then under submersion in liquid nitrogen at 77.35 K. Each sensor then was returned to the above-noted room temperature and cycled in liquid helium (4.2° K.) six times, the voltage under the above-noted drive current being read each time. Generally, the sensors will be found to be acceptable from a repeatability basis when the above testing shows that any peak-to-peak deviation falls within 60° millikelvin (12 millivolts for the sensor at hand) for the last four cycles from room temperature to the temperature of liquid helium. The peak-to-peak deviation (°mK.) for the above-noted test are reproduced in Table 5 at column A. After storage under indoor ambient conditions, on July 10, 1985, the noted TG-120-FP sensors were again subject to the above production test. Additionally, those sensors designated OPC-230-2 through OPC-230-4 were subjected to the noted test. Peak-to-peak deviations in degrees millikelvin (°mK.) were determined and the results are tabulated in column B of Table 5. The sensor designated OPC-230-4 experienced a solder joint break and no data were obtained therefrom. With the latter exception, the results are shown to fall well within the criteria for acceptability of the devices.

TABLE 5

| Sensor | A<br>P to P Dev (°mK.) | B<br>P to P Dev (°mK.) |
|---|---|---|
| TG-120-FP-1 | 9.6 | 33.8 |
| TG-120-FP-2 | 15.0 | 11.2 |
| TG-120-FP-3 | 8.4 | 41.6 |
| TG-120-FP-4 | 2.8 | 26.3 |
| TG-120-FP-5 | 40.3 | 41.4 |
| TG-120-FP-6 | 21.3 | 23.9 |
| TG-120-FP-7 | 4.9 | 47.4 |
| OPC-230-2 | — | 2.8 |
| OPC-230-3 | — | 2.7 |
| OPC-230-4 | — | — |

A comparison also was made of the last or sixth reading taken of the type TG-120-FP sensors within the liquid helium environment on Mar. 4, 1985, with the first such liquid helium reading subsequently taken on July 10, 1985. For purposes of carrying out a comparison, the voltage of the readings taken on Mar. 4, 1985 (designated $V_1$), were subtracted from the voltage values of the first reading taken on July 10, 1985 (designated $V_2$), and the difference thereof was divided by the typical sensitivity of gallium aluminum arsenide sensors at 4.2° K. temperatures or a value of dV/dT was established as typically at 180 mV/°K. A Delta value in degrees millikelvin then was derived by dividing the noted voltage difference by the sensitivity, dV/dT, and multiplying the results by 1,000. The above computation may be represented by the following expression:

$$\text{Delta} = \frac{[V_1 - V_2]}{-dV/dT} \times 10^3$$

Table 6 shows the thus-derived Delta values for the identified sensors.

TABLE 6

| Sensor | Delta (°mK.) |
|---|---|
| TG-120-FP-7 | −45.1 |
| TG-120-FP-6 | −15.4 |
| TG-120-FP-5 | −34.5 |
| TG-120-FP-4 | 3.4 |
| TG-120-FP-3 | −14.9 |
| TG-120-FP-2 | 6.3 |
| TG-120-FP-1 | 40.7 |

The Delta values of Table 6 show acceptable repeatability values based upon the noted Delta evaluation.

During the period from July 10 through July 12, 1985, the above-identified seven type TG-120-FP sensors as well as the three type OPC-230 sensors were subjected to a rigorous testing procedure wherein they were cycled from ambient room temperature to liquid nitrogen temperature (77.35° K.) ten times. On the tenth cycle of their submersion in liquid nitrogen, the forward voltage across each sensor was read under conditions of 10 microampere drive input. The sensors then were plunged into liquid helium where the forward voltage under the noted drive again was read. This procedure was carried out ten times for a test which thus involved 100 thermal cycles. This form of thermal cycling subjects the sensor to a great deal of thermal stress and strain such that it constitutes a worst case condition for testing purposes. For example, when two dissimilar materials with different thermal expansion coefficients are in physical contact, they tend to shear or separate when so rapidly cooled or warmed. The cycling from ambient room temperature to liquid nitrogen temperature (77.35 K.), as opposed to liquid helium temperature (4.2° K.), remains quite rigorous inasmuch as the materials that comprise the sensor and package undergo most of their expansion and contraction over this temperature range and little additional expansion and contraction between liquid nitrogen temperature and liquid helium temperature. A substantially higher thermal stress/strain is not imposed on the sensors by cycling them to a temperature lower than that of liquid nitrogen. It should be noted that the field use of the sensors involves an environment wherein temperatures are changing only gradually as opposed to the "shocking" technique used in this testing. Additionally, it should be noted that accurate temperature readings in liquid cryogens is compounded by thermal effects of turbulence and the like. Thus, the data set forth below represent a worst case performance since the data include such thermal effects. The results of the testing are revealed in Table 7, the deviations from peak to peak and standard deviations being tabulated for liquid nitrogen (77.35° K.) and liquid helium (4.2° K.). Sensor TG-120-FP-5 failed in the course of the test. However, the tabulation reveals that the sensors perform quite well.

TABLE 7

| Sensor | Liquid Nitrogen | | Liquid Helium | |
|---|---|---|---|---|
| | P/P Dev. (°K.) | Std. Dev. (°K.) | P/P Dev. (°K.) | Std. Dev. (°K.) |
| TG-120-FP-1 | .575 | .174 | .057 | .019 |
| TG-120-FP-2 | 1.34 | .416 | .024 | .0072 |
| TG-120-FP-3 | .225 | .077 | .048 | .018 |
| TG-120-FP-4 | .342 | .105 | .019 | .014 |
| TG-120-FP-5 | — | — | — | — |
| TG-120-FP-6 | .240 | .077 | .037 | .011 |
| TG-120-FP-7 | .275 | .079 | .043 | .016 |
| OPC-230-2 | .033 | .012 | .0043 | .0011 |
| OPC-230-3 | .042 | .013 | .0078 | .0023 |
| OPC-230-4 | .050 | .018 | .0086 | .0035 |

The data as obtained above was further analyzed by determining the deviations in degrees millikelvin from the mean of all readings for each sensor. These data were tabulated with respect to the number of cycles wherein each sensor was plunged into liquid nitrogen and the results are shown in Table 8 below for the liquid helium measurements.

TABLE 8

| Cycle Number | TG-120-FP (°mK.) | | | | | | | OPC-230 (°mK.) | | |
|---|---|---|---|---|---|---|---|---|---|---|
| | 1 | 2 | 3 | 4 | 5 | 6 | 7 | 2 | 3 | 4 |
| 0 | 14.2 | −6.8 | −28.4 | −24.2 | — | −26.2 | 13.7 | 0.53 | 1.89 | 3.2 |
| 10 | 4.0 | −8.3 | −30.6 | −25.3 | — | −15.8 | −13.2 | −1.2 | 0.69 | 3.2 |
| 20 | −3.6 | −3.8 | 12.9 | −0.53 | — | 7.92 | 29.1 | 0.36 | 4.06 | 3.1 |
| 30 | 21.0 | 0.13 | 13.1 | 8.8 | — | 10.8 | −4.5 | −0.25 | 3.5 | −4.98 |

TABLE 8-continued

| Cycle Number | TG-120-FP (°mK.) | | | | | | | OPC-230 (°mK.) | | |
| --- | --- | --- | --- | --- | --- | --- | --- | --- | --- | --- |
| | 1 | 2 | 3 | 4 | 5 | 6 | 7 | 2 | 3 | 4 |
| 40 | −2.1 | 1.8 | −6.3 | 5.1 | — | −5.52 | −7.33 | −0.19 | 0.72 | −5.2 |
| 50 | −21.6 | 6.5 | 17.1 | 8.8 | — | 9.92 | 29.9 | −2.4 | −0.61 | −2.5 |
| 60 | −3.9 | 6.8 | 16.2 | 8.9 | — | 5.31 | −0.56 | −1.2 | −0.28 | 3.1 |
| 70 | −8.9 | −3.1 | −16.1 | −1.4 | — | 3.48 | −9.56 | 2.0 | −0.94 | −0.48 |
| 80 | −17.9 | −2.6 | 12.7 | —* | — | 5.92 | −6.67 | 0.69 | −1.0 | 0.46 |
| 90 | −11.9 | 15.8 | −1.1 | 17.9 | — | 1.25 | −8.0 | 0.92 | −2.78 | 2.6 |
| 100 | 30.6 | −6.5 | 10.2 | 1.9 | — | 0.31 | −10.4 | 0.47 | −3.78 | −2.5 |

Figure 7:
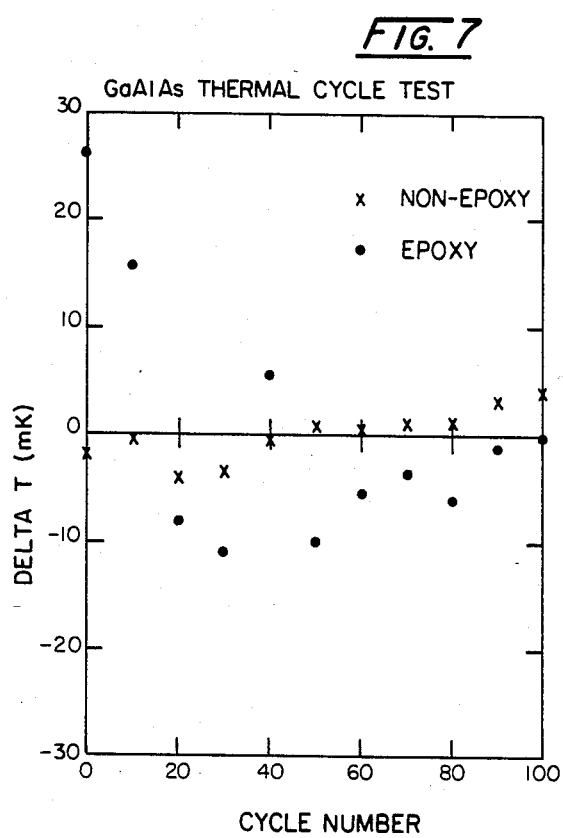
FIG. 7 is a graph showing the long term repeatability characteristics of gallium aluminum arsenide thermometers.

Note that the liquid nitrogen cycling is tabulated in decade fashion, and, additionally, it may be seen that sensor TG-120-FP-5 failed and the asterisk shown for sensor TG-120-FP-4 for cycle 80 was not recorded inasmuch as a lead came off the device in the course of that portion of the test. The results shown in Table 8 can be appreciated graphically. In this regard, the data derived for sensors TG-120-FP-6 and OPC-230-3 are shown in FIG. 7, where the former are labelled "epoxy" and the latter are labelled "non-epoxy".

Figure 2:
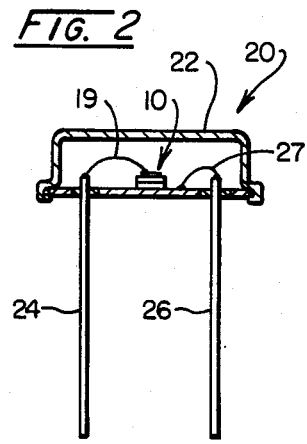
FIG. 2 is a sectional side view of one packaging arrangement within which the diode of FIG. 1 may be mounted.
Figure 3:
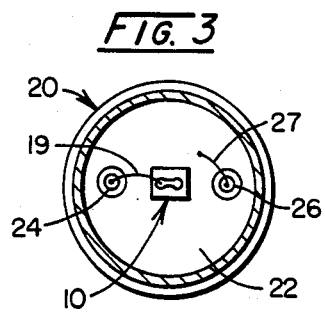
FIG. 3 is a top sectional view of the packaging arrangement of FIG. 2.

In assembling a gallium aluminum arsenide diode for a thermometer, the diode initially is packaged in accordance with its intended use, one such use being described in conjunction with FIG. 2 herein. Following this packaging procedure, the diode is cycled from a predetermined higher temperature to a predetermined cryogenic range temperature, herein considered to be a temperature below −100° C. In general, for the cryogenic region, the diodes will be cycled from room temperature to 4.2° K. Upon determining the packaged diode to be appropriately stable, it is calibrated by immersion in a controlled temperature environment under constant drive current over a sequence of given temperatures and appropriate characteristic curve type data are derived for the given diode assembly. The diode then is mounted in its environment of intended use in conjunction with appropriate instrumentation. Generally, this instrumentation will provide for the application of a constant current source and monitoring of resultant forward voltage drop, which then is converted in conventional manner to any desired temperature readout.

Since certain changes may be made in the above-described method and apparatus, without departing from the scope of the invention herein involved, it is intended that all matter contained in the description thereof or shown in the accompanying drawings shall be interpreted as illustrative and not in a limiting sense.

We claim:

1. A thermometer temperature sensing element capable of sensing temperatures in the cryogenic range comprising a solid-state junction device formed of gallium aluminum arsenide.

2. The sensing element of claim 1 wherein said solid-state junction device is a P-N diode.

3. The sensing element of claim 1 wherein said gallium aluminum arsenide exhibits a peak spectral emission wavelength of less than 920 nm.

4. The sensing element of claim 3 wherein said peak spectral emission wavelength is between about 600 and 900 nm.

5. The sensing element of claim 4 wherein said peak spectral emission wavelength is between about 800 and 900 nm.

6. A thermometer capable of measuring temperature in the cryogenic range comprising:
a solid-state junction device formed of gallium aluminum arsenide;
a source of select current;
means for applying said source of current across said junction device; and
means for determining the value of voltage drop across said device induced by said select current.

7. The thermometer of claim 3 in which said junction device is a P-N diode.

8. The sensing element of claim 6 wherein said gallium aluminum arsenide exhibits a peak spectral emission wavelength of less than 920 nm.

9. The sensing element of claim 8 wherein said peak spectral emission wavelength is between about 600 and 900 nm.

10. The sensing element of claim 9 wherein said peak spectral emission wavelength is between about 800 and 900 nm.

11. A method for determining the temperature of a given body comprising the steps of:
providing a sensing element as a gallium aluminum arsenide diode;
thermally associating said diode and said body in heat exchange relationship;
applying constant current to said diode; and
determining the resultant voltage drop thereacross.

12. The method of claim 11 wherein said diode is a P-N diode.

13. The method of claim 12 wherein said body is subject to a temperature of between about 500° K. and a temperature within the cryogenic range.

14. The method of claim 13 wherein said body is subject to a temperature of below about −110° C.

15. The sensing element of claim 11 wherein said gallium aluminum arsenide exhibits a peak spectral emission wavelength of less than 920 nm.

16. The sensing element of claim 15 wherein said peak spectral emission wavelength is between about 600 and 900 nm.

17. The sensing element of claim 16 wherein said peak spectral emission wavelength is between about 800 and 900 nm.

* * * * *